United States Patent Office 3,541,069
Patented Nov. 17, 1970

3,541,069
PREPARATION OF HIGHLY ALCOHOLYZED
POLYVINYL ALCOHOL
John E. Bristol, Niagara Falls, and Harold K. Inskip, Tonawanda, N.Y., assignors to E. I du Pont de Nemours and Company, Wilmington, Del., a corporation of Delaware
No Drawing. Filed Apr. 29, 1968, Ser. No. 725,138
Int. Cl. C08f 3/34
U.S. Cl. 260—91.3                              5 Claims

ABSTRACT OF THE DISCLOSURE

Polyvinyl alcohols produced by the continuous base-catalyzed alcoholysis of polyvinyl esters such as polyvinyl acetate at elevated temperatures are obtained as filter cakes wet with a solvent mixture of the hydrolytic alcohol and the by-product ester of the alcoholysis reaction, e.g., a mixture of methanol and methyl acetate. The polyvinyl alcohols so obtained are generally about 99 to 99.5% alcoholyzed. The method of the invention effects further alcoholysis of such products by washing such a wet filter cake with a solution of a base alcoholysis catalyst in the hydrolytic alcohol, and drying the resulting wet polyvinyl alcohol cake at an elevated temperature in an atmosphere containing carbon dioxide. By this method, undiscolored polyvinyl alcohols which are at least 99.7 to 99.9% or more alcoholyzed can be readily obtained.

BACKGROUND OF THE INVENTION

One widely used type of polyvinyl alcohol which is from 99 to 99.5% alcoholyzed is conveniently made by a continuous method in which an alcoholysis mixture is continuously formed by bringing together (1) a solution of a polyvinyl ester such as polyvinyl acetate in a hydrolytic alcohol and (2) a base alcoholysis catalyst, particularly a metal alcoholate catalyst, and effecting the alcoholysis at elevated temperatures, i.e., at least 45° C., under agitation so as to produce a product polyvinyl alcohol slurry in a solvent mixture of the excess hydrolytic alcohol and the by-product ester of such alcohol with the acetate groups of the polyvinyl acetate. Such a slurry, after completion of the alcoholysis reaction, is generally neutralized by the addition of an acid such as acetic acid, following which the polyvinyl alcohol product is filtered and dried. Such a method is described in Bristol and Tanner U.S. Pat. 2,734,048. As indicated, polyvinyl alcohols made by such methods are generally alcoholyzed to the extent of 99 to 99.5%, i.e., from 99 to 99.5% of the original acetate groups of the parent polyvinyl acetate have been replaced by hydroxyl groups. Products which are at least 99% alcoholyzed can be readily obtained but the extent of the alcoholysis generally will not exceed about 99.5% in such methods, regardless of the time permitted for the reaction, the temperature employed, or the concentration of base catalyst used.

While polyvinyl alcohols alcoholyzed to the extent indicated above are widely used, products which are alcoholyzed to an even greater extent are desirable for some uses because they are more resistant to water and thus yield films, coatings, and the like, which are more resistant to water and are swelled less by water and are, thus, more desirable for certain applications. A polyvinyl alcohol which is 99.5% alcoholyzed has a saponification number of about 6.3, whereas a polyvinyl alcohol which is 100% alcoholyzed would, of course, have a saponification number of 0. Polyvinyl alcohols which are more than about 99.5% alcoholyzed are sometimes referred to as "super alcoholyzed," or "super hydrolyzed," polyvinyl alcohols because they are more highly alcoholyzed than the more usual commercial polyvinyl alcohol that is 99 to 99.5% alcoholyzed.

Polyvinyl alcohols which are alcoholyzed, hydrolyzed, or saponified to the extent that they contain not more than about 0.3% residual acetate groups (Sap. No. of 3.8) have been prepared by various methods. Thus, Canadian Pat. 663,659 discloses a method which involves saponifying polyvinyl acetate dissolved in methanol in the presence of a saponification catalyst which is a mixture of sodium hydroxide and a small amount of sodium carbonate or bicarbonate, filtering the initial polyvinyl alcohol product and drying the resulting filter cake prior to neutralization of the saponification catalyst. It is disclosed that the sodium carbonate or bicarbonate component of the catalyst remains effective during the drying period whereby replacement of acetate groups by hydroxyl groups proceeds further than would be the case if a pure sodium hydroxide catalyst were employed. This patent also disclosed that the residual acetate content of polyvinyl alcohol can be decreased by a so-called re-saponification method wherein the initially saponified product is soaked in an aqueous or an alcoholic solution of caustic alkali. It is also said that reduction of the residual acetate content can be achieved to some extent by increasing the amount of caustic alkali employed during the alcoholysis, but these methods are indicated to be too expensive or undesirable for various reasons.

Another method for producing highly alcoholyzed polyvinyl alcohol, i.e., product having a very low residual acetate content, is described in French Pat. 1,410,550. That method involves filtering a typical polyvinyl alcohol reaction slurry, partially dying the filter cake and then treating it with a mixture of sodium methylate or sodium hydroxide in methanol and water, following which the filter cake is dried.

The method of the present invention is a relatively simple method of converting polyvinyl alcohols which are 99 to about 99.5% alcoholyzed to more highly alcoholyzed products, which method is more practical than the prior methods referred to above and is readily integrated into a continuous method for producing polyvinyl alcohol such as described in the above-mentioned Bristol and Tanner patent.

SUMMARY OF THE INVENTION

The invention relates to a method for treating a particulate polyvinyl alcohol obtained by a continuous base-catalyzed alcoholysis of a polyvinyl ester, which polyvinyl alcohol is about 99 to 99.5% alcoholyzed and is wet with a mixture of the hydrolytic alcohol and the by-product ester of such alcohol resulting from the alcohoylsis reaction, weherby the polyvinyl alcohol is further alcoholyzed to obtain undiscolored polyvinyl alcohol products that are essentially completely alcoholyzed. The method involves washing such a wet cake of about 99 to 99.5% alcoholyzed polyvinyl alcohol with a solution of a base alcoholysis catalyst in the hydrolytic alcohol, whereby the by-product ester content of the original wet cake is markedly reduced, leaving a cake of the polyvinyl alcohol wet with the alcohol solution of the alcoholysis catalyst which is then dried at an elevated temperature in an atmosphere comprising an inert gas and at least about 5% carbon dioxide by volume.

DETAILED DESCRIPTION AND PREFERRED EMBODIMENTS

This invention relates to polyvinyl alcohol products produced in continuous alcoholysis methods in which the polyvinyl alcohol product is obtained as a slurry in a solvent mixture of an excess of the hydrolytic alcohol and the by-product ester of the alcoholysis reaction. Thus, in the method of Bristol and Tanner U.S. Pat. 2,734,048, a solution of about 30 to 60% polyvinyl acetate in methanol and a dilute solution of sodium methylate alcoholysis catalyst in methanol are continuously fed to the alcoholysis vessel wherein the reaction proceeds to produce a slurry of the partially alcoholyzed polyvinyl acetate, which slurry generally overflows to a holdup vessel and finishers in which the reaction is completed, such use of a holdup vessel and finishers also functioning to minimize short circuiting. Typically, for a 40% feed solution of polyvinyl acetate in methanol the average holdup time in such alcoholysis systems is about 2 hours when the alcoholysis temperature is about 45–55° C., and the composition of the final slurry product, in parts by weight, is about 20 parts polyvinyl alcohol, 35 parts methyl acetate, 45 parts methanol and 0.3 part sodium methylate. In the usual operation, the product slurry is treated with acetic acid to neutralize the base catalyst and the slurry is then concentrated by filtration or centrifugation to give a filter cake containing about 45% to about 55% by weight polyvinyl alcohol with the balance being a solvent mixture of methanol and methyl acetate. The final polyvinyl alcohol product is obtained by drying such a neutralized filter cake.

In continuous alcoholysis methods of the type indicated above, it is very difficult to obtain a final product which is alcoholyzed to an extent greater than about 99.5%, corresponding to a saponification number of about 6.3, even by holding a portion of the product slurry at elevated temperatures for an extended period of time. Raising the alcoholysis temperature or increasing the alcoholysis catalyst concentration has little effect. An equilibrium is apparently involved between methanol and the vinyl acetate units in the polymer on the one hand and by-product methyl acetate and vinyl alcohol units in the polymer on the other hand. It is not a simple equilibrium since the polymer is a solid and the relative proportion of methanol and methyl acetate held by the solid is different from that in the liquid or solvent phase. The equlibrium can be shifted somewhat towards more complete alcoholysis by a major increase in the methanol concentration, but this is costly and lowers proportionately the production rate. Some increase in the extent of alcoholysis can be achieved by simply not neutralizing the alcoholysis mixture prior to drying the filter cake. However, the resulting increase in alcoholysis is slight, corresponding to a decrease in the saponification number of only about 0.5–1 unit, and the final dried product is usually discolored.

The present invention is based upon the discovery that if the polyvinyl alcohol filter cake obtained in processes of the above type, which cake is, of course, wet with a solvent mixture of the hydrolytic alcohol and the by-product ester, is washed with the hydrolytic alcohol so as to reduce markedly the by-product ester content of the filter cake, and the resulting washed cake is then dried in the presence of a base alcoholysis catalyst in an atmosphere of an inert gas containing carbon dioxide, the degree of alcoholysis can be significantly increased during the drying and an undiscolored polyvinyl alcohol product having a very low residual acetate content can be readily obtained.

The washing of the wet filter cake with the hydrolytic alcohol such as methanol should be sufficient to reduce the byproduct ester, e.g., methyl acetate, content of the filter cake to not more than 10% of the weight of the solvent mixture wetting the polyvinyl alcohol product. Preferably, the methyl acetate content will be reduced as low as possible although excellent results are achieved when it is reduced to a value equal to 4 to 6% of the total solvent wetting the polyvinyl alcohol. Such reduction can be achieved in a variety of ways, e.g., by slurrying the wet cake in methanol then filtering the resulting slurry and repeating such operation as many times as is necessary to achieve the desired reduction in the methyl acetate content. A very practical way of effecting the washing is to simply wash the filter cake thoroughly, e.g., in a filter bed, with methanol until the methyl acetate content of the remaining wet cake has been sufficiently reduced. Prior to drying, a base alcoholysis catalyst such as an alkali metal hydroxide or alcoholate, preferably sodium methylate should be uniformly distributed throughout the filter cake at an effective concentration. This is readily accomplished by effecting the washing with methanol using a dilute solution of the catalyst in the methanol, whereby the washing to remove methyl acetate and the incorporation of the alcoholysis catalyst is achieved simultaneously. The concentration of the alcoholysis catalyst in the cake that is to be dried should generally range from about 0.1 to about 0.5%, preferably 0.2 to about 0.3%, of the total weight of the cake. Higher concentrations also are effective but are generally undesirable in that they yield final dried products having an undesirably high ash content. Lower concentrations can be used but usually result in less complete alcoholysis.

Drying of the washed filter cake containing the alcoholysis catalyst will usually be effected at an elevated temperature, temperatures ranging from around 50° to 100° C. being generally usable although temperatures of about 70° C. to 90° C. are generally preferred. Under such temperature conditions, the major portion of the reaction occurs during the first ½ hour of drying and generally drying times longer than about 3 hours are unnecessary. Drying times of about ½ to 2 hours will most generally be employed. The drying operation should be effected in an inert gaseous atmosphere containing at least about 5% by volume of carbon dioxide. Preferably, the drying atmosphere will contain from about 7 to 50% carbon dioxide by volume. Higher carbon dioxide concentrations can be used, but they are usually more costly and do not result in any added advantage.

The polyvinyl alcohol in the wet filter cake that is treated in accordance with the invention will generally be rather finely divided. However, the effectiveness of the present treating method for increasing the degree of alcoholysis is not particularly dependent upon the particle size of the polyvinyl alcohol in the filter cake. Thus, a polyvinyl alcohol product having an average particle size greater than 40 mesh (U.S. Standard Sieve Scale) gave essentially the same results as did polyvinyl alcohol product having an average particle size less than 200 mesh.

The method of the invention is illustrated by the following examples in which all parts and liquid or solid percentage compositions are by weight.

In the examples, all wet filter cakes were dried in a 500 ml. round bottomed flask provided with a standard tapered joint having a gas delivery tube therein extending to near the bottom of the flask. The neck of the flask was provided with a gas exit tube and the flask during the drying operation was rotated in an inclined position in a constant temperature water bath so that as the flask was rotated the filter cake charge therein would simulate the tumbling effect produced in a normal rotary drier, thus preventing caking of the material on the walls and the formation of large dried lumps. During the drying operation, a mixture of nitrogen and carbon dioxide was passed through the flask at the rate of 50 to 60 ml./min.

A standard method for determining the saponification number of polyvinyl alcohol is to weigh a small sample of the dried powdered material into a mixture of 1 part of water and 1 part of 95% ethanol, add an indicator (phenolphthalein or meta-cresol purple), then adjust the mixture to the end point with dilute hydrochloric acid or sodium hydroxide as required. A measured amount of standard sodium hydroxide solution is then added, the mixture is boiled for one hour, and the excess sodium hydroxide is determined by titrating back to the same end point with standard hydrochloric acid. The saponification number, which in the quantity of alkali, calculated as milligrams of potassium hydroxide, that is necessary to saponify 1 gram of the polyvinyl alcohol, is calculated as follows:

$$\text{Sap. No.} = \frac{(a-b)(\text{Normality of HCl}) \times 56.1}{\text{wt. of sample (g.)}}$$

where $a$ is the number of ml. of HCl required for a blank and $b$ is the number of ml. of HCl required for the sample.

The above standard method for determining the saponification number of polyvinyl alcohol gives reliable and reproducible results when determining the saponification numbers of polyvinyl alcohol slurries which have been dried after neutralizing the base alcoholysis catalyst. It has been found, however, that polyvinyl alcohols obtained by drying unneutralized filter cakes (i.e., those containing the original base catalysts or base catalysts added after washing the original filter cake) in a carbon dioxide-containing atmosphere in accordance with the present invention, give erratic saponification numbers when those numbers are determined using the above standard method, particularly when the saponification numbers are lower than about 5. Thus, in the case of highly alcoholyzed products obtained by drying unneutralized filter cakes in a carbon dioxide-containing atmosphere, the standard method for determining saponification numbers has been found to give values generally too low; in fact, negative values are sometimes obtained. Such low numbers apparently reflect the interference in the method by sodium carbonate or bicarbonate which is believed to be present in the finally dried product.

It has been found that the above standard method for determining saponification numbers can be modified so as to give reliable and reproducible results for products obtained by drying an unneutralized cake in a carbon dioxide-containing atmosphere. In the modified method, the sample of polyvinyl alcohol to be tested is added to the usual water-alcohol mixture, as in the standard method, and the resulting mixture is treated with enough hydrochloric acid to take the pH to about 2. The mixture is then heated to 50° C. for about 5 minutes to drive off all carbon dioxide, then brought back to the standard end point with sodium hydroxide, and then analyzed in the manner set forth above for the standard method. This method gave reproducible saponification numbers which were significantly higher than the erratic numbers given by the standard method for highly alcoholyzed products obtained by drying unneutralized filter cake in an atmosphere containing carbon dioxide. This is the "modified method" referred to in the examples below.

EXAMPLE 1

A polyvinyl alcohol slurry was prepared by continuously feeding to an alcoholysis vessel a solution of polyvinyl acetate in methanol and a dilute solution of sodium methylate in methanol to produce in the acoholysis vessel a slurry of partially hydrolyzed polyvinyl acetate, which slurry overflowed to a holdup vessel and a finisher, according to the general method described in Bristol and Tanner U.S. Pat. 2,734,048. The slurry from the finisher, consisting of about 19 parts of polyvinyl alcohol having a saponification number of 6.5 (standard method), 32 parts of methyl acetate and 49 parts of methanol, was neutralized with acetic acid. A 1575-g. portion of the neutralized slurry was treated with 65 g. of a 10% solution of sodium methylate in methanol to adjust the sodium methylate content of the slurry to about 0.3%. The slurry was then filtered on a Buchner funnel to give a filter cake containing about 45.5% solids (polyvinyl alcohol and sodium methylate), the remainder being a volatile portion consisting of about two thirds methanol and one third methyl acetate. About 325 g. of the filter cake were spread out on a Buchner funnel and washed slowly thereon with 250 g. of a 0.3% solution of sodium methylate in methanol, following which the filter cake was again pulled down to a solids content of about 45%. The methyl acetate content of the solvent wetting the cake was about 1.2%. A 75-g. portion of the resulting washed filter cake was dried as generally described above while passing a nitrogen-carbon dioxide mixture containing 16.7% by volume of carbon dioxide through the drying flask held in a water bath at 86 to 87° C. The carbon dioxide-nitrogen mixture was bubbled through water at 62° C. prior to being passed into the drying flask. The resulting dried polyvinyl alcohol product had a saponification number of 2.6, determined by the modified method. By the standard method, the saponification number was 1.2.

When a 75-g. portion of the above original polyvinyl alcohol filter cake which had not been previously washed with the sodium methylate solution and which was wet with liquid containing about ⅓ methyl acetate and ⅔ methanol as described above was dried under similar conditions, the polyvinyl alcohol product obtained had a saponification number of 5.1 when determined by the modified method and a saponification number of 4.4 when determined by the standard method.

The above results show that when the original wet filter cake is washed with a dilute solution of sodium methylate in methanol (whereby the methyl acetate content of the filter cake is drastically reduced) and the cake then dried, the resulting product is alcohlyzed to a significantly greater extent than is product similarly obtained except that the starting wet filter cake is not washed to reduce the methyl acetate content thereof. Both products obtained by drying in the carbon dioxide-containing atmosphere were white and showed no significant discoloration.

EXAMPLE 2

A somewhat different polyvinyl alcohol slurry was prepared, also according to the general method described in Bristol and Tanner U.S. Pat. 2,734,048, except that it consisted of particles substantially coarser than the particles of the product employed in Example 1. The material used in Example 1 was finer than 200 mesh, whereas the material used here was mainly in the 40–100 mesh range. The composition of the polyvinyl alcohol slurry was approximately 20 parts polyvinyl alcohol having a saponification number of about 6 (standard method), 35 parts of methyl acetate, 45 parts of methanol and 0.3 part of sodium methylate. A portion of this slurry was filtered on a Buchner funnel, then covered with a rubber dental dam and held at aspirator pressure for 2 minutes to give a filter cake having a solids content (polyvinyl alcohol and sodium methylate) of about 55%, the volatile portion thereof consisting of about ⅓ methyl acetate and ⅔ methanol. A 200-g. portion of the filter cake was washed slowly on the funnel with 300 g. of a 0.3% solution of sodium methylate in methanol, following which the washed cake was sucked dry with an aspirator to give a wet cake containing 0.4% methyl acetate, 41.6% methanol, 0.36% water and 0.45% sodium methylate, the balance consisting of polyvinyl alcohol. A portion of the washed wet cake was dried as in Example 1 except that the drying flask was held in a water bath maintained at 80° C. instead of 86 to 87° C. Samples of the material undergoing drying were taken at intervals of about 40 minutes for saponification number determinations. The results obtained are tabulated below, all saponification numbers being determined by the modified method.

| Drying time, in minutes: | Saponification number |
|---|---|
| 0 | 5.1 |
| 40 | 1.4 |
| 88 | 1.8 |
| 124 | 0.6 |

All of the dried samples were essentially white, no discoloration being apparent from the drying operation. The above saponification data show that most of the alcoholysis achieved during the drying operation occured within about the first half hour, although significant reduction in the saponification number resulted by extending the drying period up to about 2 hours. The saponification number of 0.6 for the material dried 124 minutes represents a degree of alcoholysis in excess of 99.9%, which, for practical purposes, represents complete alcoholysis.

Films (1-mil. thick) were prepared of two samples of polyvinyl alcohol by casting ten percent by weight aqueous solutions on a heated, highly polished casting plate. The two dry samples were prepared from a polyvinyl alcohol slurry essentially identical to that described in Example 2. One was isolated and dried in the standard commercial manner and had a saponification number of about 6. The second was obtained by the general method of Example 2. Its saponification number was about 2.5. Standard specimens of the two films were soaked in water at room temperature for one hour and the present area increase (a measure of the water sensitivity) was determined. The area of the standard specimen increased 80%, while that of the more fully hydrolyzed product increased only 65%, representing a significant reduction in water sensitivity.

We claim:

1. In a method for producing polyvinyl alcohol wherein a slurry of a polyvinyl alcohol in a mixture of a hydrolytic alcohol and the by-product ester of the alcoholysis reaction is obtained and the slurry is filtered to obtain a filter cake of said polyvinyl alcohol wet with said mixture of the hydrolytic alcohol and the by-product ester, which polyvinyl alcohol is 99 to 99.5% alcoholyzed, the improvement comprising washing said polyvinyl alcohol with a hydrolytic alcohol whereby the by-product ester content of the liquid wetting the filter cake is reduced so as not to exceed about 10% by weight, incorporating in the washed filter cake a base alcoholysis catalyst, and then drying said filter cake at a temperature of 50 to 100° C. in an inert gaseous atmosphere containing at least 5 volume percent carbon dioxide to effect further alcoholysis of said polyvinyl alcohol and to obtain an undiscolored dry polyvinyl alcohol.

2. The method of claim 1 wherein the original wet filter cake is washed with a dilute solution of the base alcoholysis catalyst in the hydrolytic alcohol, whereby the reduction in the by-product ester content of the filter cake and the incorporation of the base alcoholysis catalyst are effected simultaneously.

3. The method of claim 1 wherein the hydrolytic alcohol is methanol.

4. The method of claim 1 wherein the alcoholysis catalyst is sodium methylate.

5. The method of claim 2 wherein the hydrolytic alcohol is methanol and the alcoholysis catalyst is sodium methylate.

References Cited

UNITED STATES PATENTS

| 2,464,290 | 3/1949 | Bowen | 260—90 |
| 2,734,048 | 2/1959 | Bristol et al. | 260—91.3 |
| 3,278,505 | 10/1966 | Kominami | 260—89.1 |

FOREIGN PATENTS

| 1,410,550 | 1965 | France. |
| 24,712 | 11/1964 | Japan. |

JOSEPH L. SCHOFER, Primary Examiner

S. M. LEVIN, Assistant Examiner

U.S. Cl. X.R.

260—89.1